United States Patent [19]
Korsunsky et al.

[11] Patent Number: 5,969,330
[45] Date of Patent: Oct. 19, 1999

[54] SMART CARD READER WITH HINGED COVER AND COVER ACTUATING SURFACE

[75] Inventors: Iosif Korsunsky, Harrisburg; Dimitry G. Grabbe, Middletown; Dean Vermeersch, Harrisburg, all of Pa.

[73] Assignee: The Whitaker Corporation, Wilmington, Del.

[21] Appl. No.: 08/933,691

[22] Filed: Sep. 19, 1997

Related U.S. Application Data

[60] Provisional application No. 60/031,442, Nov. 20, 1996.

[51] Int. Cl.⁶ ..................................................... G06K 7/00
[52] U.S. Cl. ......................... 235/486; 235/441; 439/260
[58] Field of Search ................................. 235/441, 475, 235/483, 486, 492; 439/260, 630; 364/708.1; 365/52; 361/737

[56] References Cited

U.S. PATENT DOCUMENTS

| | | | |
|---|---|---|---|
| 4,221,448 | 9/1980 | Logerot et al. | 339/75 MP |
| 4,602,351 | 7/1986 | Shimamura et al. | 365/52 |
| 4,721,348 | 1/1988 | Mouissie | 439/328 |
| 4,724,310 | 2/1988 | Shimamura et al. | 235/483 |
| 4,735,578 | 4/1988 | Reichardt et al. | 439/152 |
| 4,743,746 | 5/1988 | Murschall et al. | 235/486 |
| 4,820,186 | 4/1989 | Fujii et al. | 439/326 |
| 4,843,223 | 6/1989 | Shino | 235/487 |
| 4,870,604 | 9/1989 | Tatsuno | 364/708.1 |
| 4,887,188 | 12/1989 | Yoshida et al. | 361/413 |
| 4,938,716 | 7/1990 | Chabrolle et al. | 439/635 |
| 4,961,710 | 10/1990 | Komatsu | 439/267 |
| 5,012,078 | 4/1991 | Pernet | 235/441 |
| 5,013,255 | 5/1991 | Juret et al. | 439/260 |
| 5,033,972 | 7/1991 | Komatsu et al. | 439/153 |
| 5,091,618 | 2/1992 | Takahashi | 235/441 |
| 5,198,645 | 3/1993 | Martin et al. | 235/441 |
| 5,231,274 | 7/1993 | Reynier et al. | 235/441 |
| 5,259,777 | 11/1993 | Schuder et al. | 439/188 |
| 5,278,445 | 1/1994 | Uemura et al. | 257/678 |
| 5,321,247 | 6/1994 | Mroczkowski et al. | 235/68 |
| 5,330,363 | 7/1994 | Gardner et al. | 439/188 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,369,259 | 11/1994 | Bleier et al. | 235/441 |
| 5,380,997 | 1/1995 | Hania et al. | 235/485 |
| 5,463,210 | 10/1995 | Imura | 235/441 |
| 5,508,501 | 4/1996 | Fujimoto et al. | 235/441 |
| 5,653,610 | 8/1997 | Broschard, III | 439/630 |
| 5,667,397 | 9/1997 | Broschard, III et al. | 439/188 |
| 5,674,080 | 10/1997 | Takemura | 439/260 X |
| 5,780,836 | 7/1998 | Iguchi et al. | 235/486 |
| 5,814,805 | 9/1998 | Reichardt et al. | 235/479 |
| 5,846,092 | 12/1998 | Feldman et al. | 361/737 X |
| 5,898,159 | 4/1999 | Huang | 235/441 |

FOREIGN PATENT DOCUMENTS

| | | | |
|---|---|---|---|
| 0 493 473 B1 | 9/1990 | European Pat. Off. | G05K 7/06 |
| 0520080 A1 | 6/1991 | European Pat. Off. | H05K 13/02 |

OTHER PUBLICATIONS

PCT International Search Report, PCT/US97/21395, dated Nov. 19, 1994.

*Primary Examiner*—Donald Hajec
*Assistant Examiner*—Jared J. Fureman

[57] ABSTRACT

A smart card reader (10,10') is provided for temporary electrical connection of a smart card (70) to a printed circuit board. The smart card reader (10,10') features a cover (14,14') which is hingeably mounted to a base (12) at a first end (28). The cover (14,14') is biased such that its bottom surface (26) is spaced apart from the base (12) at a second end (29). Card support projections (18) are formed from the cover (14,14') and act in combination with an actuator (20) which extends from the base (12) to draw the cover (14,14') towards the base (12) upon insertion of a smart card (70).

10 Claims, 5 Drawing Sheets

SMART CARD READER WITH HINGED COVER AND COVER ACTUATING SURFACE

This application claims the benefit of U.S. Provisional Application No. 60/031,442, filed Nov. 20, 1996.

FIELD OF THE INVENTION

This invention is related to smart card readers and more particularly to an electrical connector which provides a temporary electrical connection between the pads of a smart card and a printed circuit board.

BACKGROUND OF THE INVENTION

Smart cards are well known in the industry as being credit cards having computer chips embedded therein which are connected to metallic contact pads on a major surface of the credit card. These smart cards are insertable into smart card readers which make electrical contact with the pads of the smart card through contacts mounted in the smart card reader housing.

There are currently two types of smart card reader connectors available, sliding type and landing type. One example of the sliding type reader is disclosed in U.S. Pat. No. 5,334,827 by Bleier et al. Bleier et al. shows a sliding type reader in which a smart card is inserted into the reader and is slid over the contacts until they are aligned with the pads of the smart card. The contacts are spring loaded against the smart card while the smart card is slid into the read position. A full normal force is exerted against the smart card during the entire mating and unmating cycle to affect a wiping action from the front edge of the card along the major plastic surface and finally on to the contact pads of the smart card.

A problem exists with the sliding-type card readers as disclosed by Bleier et al. in that excess wear occurs on the reader contacts due to a long wiping path at a high normal force during the mating and unmating cycle. As a result, debris is picked up by the reader contacts as they slide along the card surface. This debris is then deposited onto the card mating pads making it more difficult to achieve a reliable electrical connection. Another problem exists with such sliding type connectors in that the wiping path along the plastic surface of the card will mar any art work which appears on the surface creating undesirable streaks where the wiping action has occurred.

An example of the landing type smart card readers is disclosed in U.S. Pat. No. 4,976,630 by Schuder et al. Schuder et al. teach a smart card reading apparatus including a stationery frame and a contact element support mounted within an opening in the frame for reciprocal movement between a read position and an initial position. Movement of the contact element support into a read position is initiated by pushing the smart card into the reader and return of the support to the initial position is accomplished by a spring which biases the support to the initial position upon removal of the smart card from the reader. Such a design is complex in that it requires the contact support to both translate in the mating direction and move transverse to the mating direction in order to land on the contact pads of the smart card.

A problem exists with these landing type smart card readers in that debris may be picked up by the reader contacts as the smart card surface passes over them. This debris may then be deposited on the smart card mating pads where electrical connection will be compromised.

A further problem exists with both of these types of smart card readers in that they typically utilize molded housings to provide guidance and alignment of the card within the smart card reader. When smart cards repeatedly come in contact with such plastic housing guiding or alignment members, dust/debris is generated as the two surfaces wear against each other. After many mating cycles, this dust/debris settles on the reader contacts and the card mating pads to have a degrading effect on the electrical contact to be established therebetween.

SUMMARY OF THE INVENTION

It is therefore an object of this invention to provide a smart card reader which does not excessively wipe the electrical contacts along the plastic surface of the smart card or create excessive dust or debris during repeated mating and unmating of a smart card with the smart card reader.

This object has been achieved by providing a smart card reader having a cover which is hingeably mounted to a base at a first end and biased to be spaced apart from the base at a second end. A card support is disposed on an inner surface of the cover proximate to the second end whereby a smart card is insertable into the reader such that it first engages the card support and then engages a cover actuating surface of the base to draw the card and the second end of the cover toward the base.

BRIEF DESCRIPTION OF THE DRAWINGS

The invention will now be described by way of example with reference to the accompanying figures of which.

DETAILED DESCRIPTION OF THE INVENTION

Figure 5:
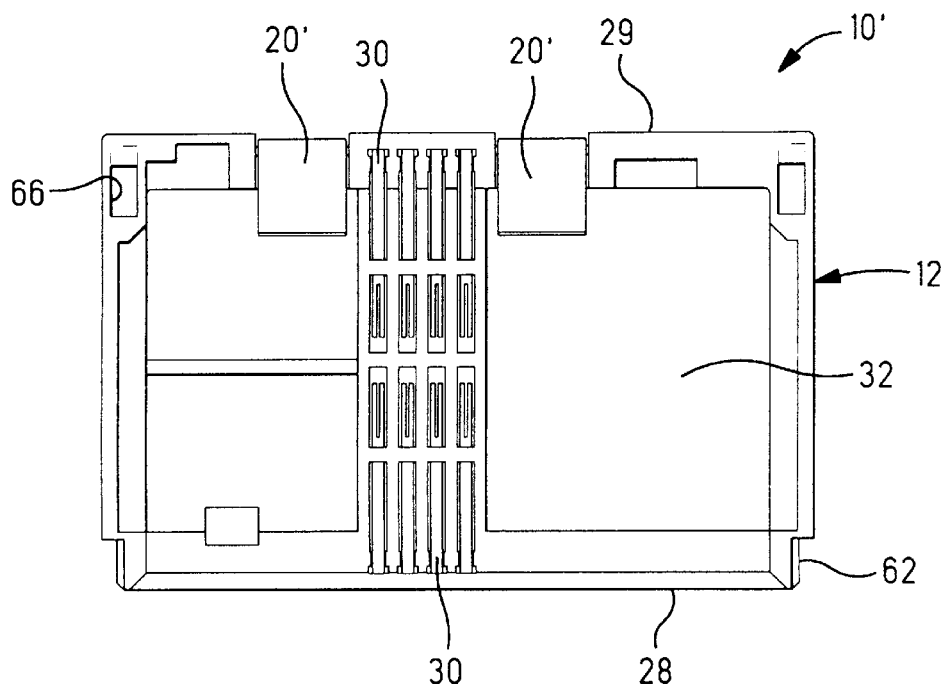
FIG. 5 shows a top view of the base of the smart card reader.
Figure 6:
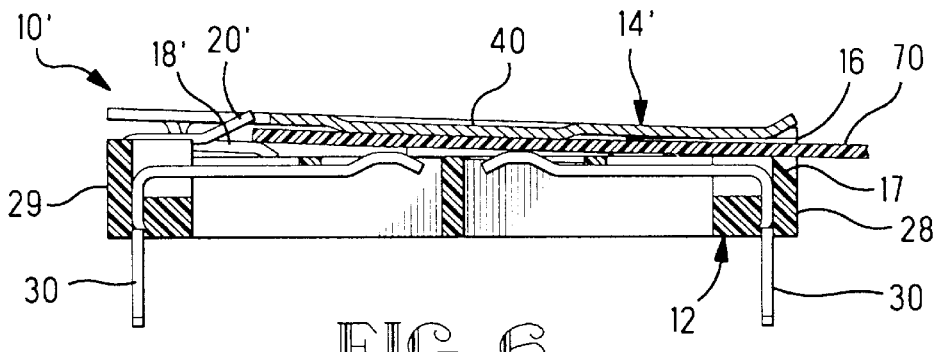
FIG. 6 shows a cross sectional view of the smart card reader of FIG. 2 taken along the line 6—6.
Figure 7:
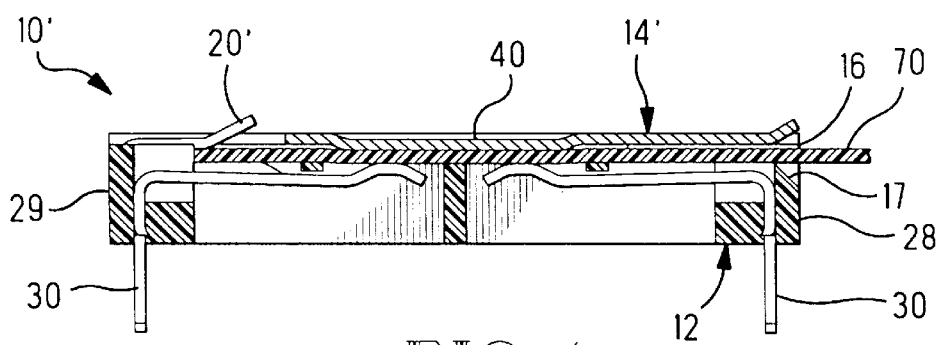
FIG. 7 shows a cross sectional view similar to that of FIG. 6 having a smart card fully inserted therein.

The invention will first be described generally with reference to FIG. 1. The smart card reader 10 consists of three major components, an insulative base 12, a cover 14 and contacts 30 which are mounted in the base 12 and are best seen in FIGS. 5 through 7. The base 12 is provided with a card-receiving opening 16 along a first end 28 to form a card-receiving area 32 therein. A cover actuator 20 extends from the base 12 at a second end 29 opposite the first end 28. This actuator 20 serves to draw the cover 14 and the card into mating engagement with contacts 30.

The cover 14 is mounted to the base 12 over the card-receiving opening 16 proximate the first end 28. A hinge 22 is formed in the cover 14 by removing a portion of the material of the cover 14 so as to create a thin section which will act as a hinge 22. The cover 14 is biased so that its lower surface 26 is spaced apart from the base 12 at a location proximate the second end 29. An opening 34 is provided in the top surface 24 and a pair of card supports 18 extend from an edge of the opening 34 toward the base 12. A smart card 70 is captured between the card supports 18 and the actuator 20 upon full insertion so as to draw the cover 14 down towards the base 12. The cover 14 is shown here as being machined from a solid material, however, as shown in the subsequent figures, an alternate cover 14' may be stamped and formed and similarly attached to the base 12. Similar features will be described with similar numbers having the addition of a prime.

Figure 4:
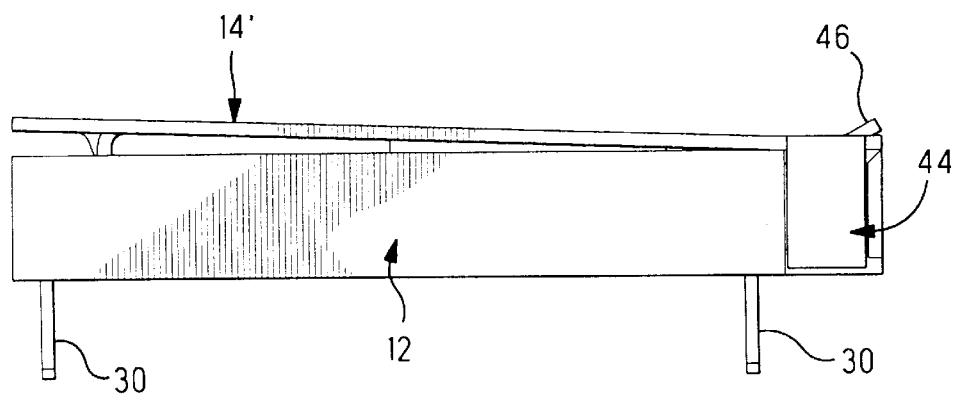
FIG. 4 shows a side view of the smart card reader of FIG. 2.
Figure 2:
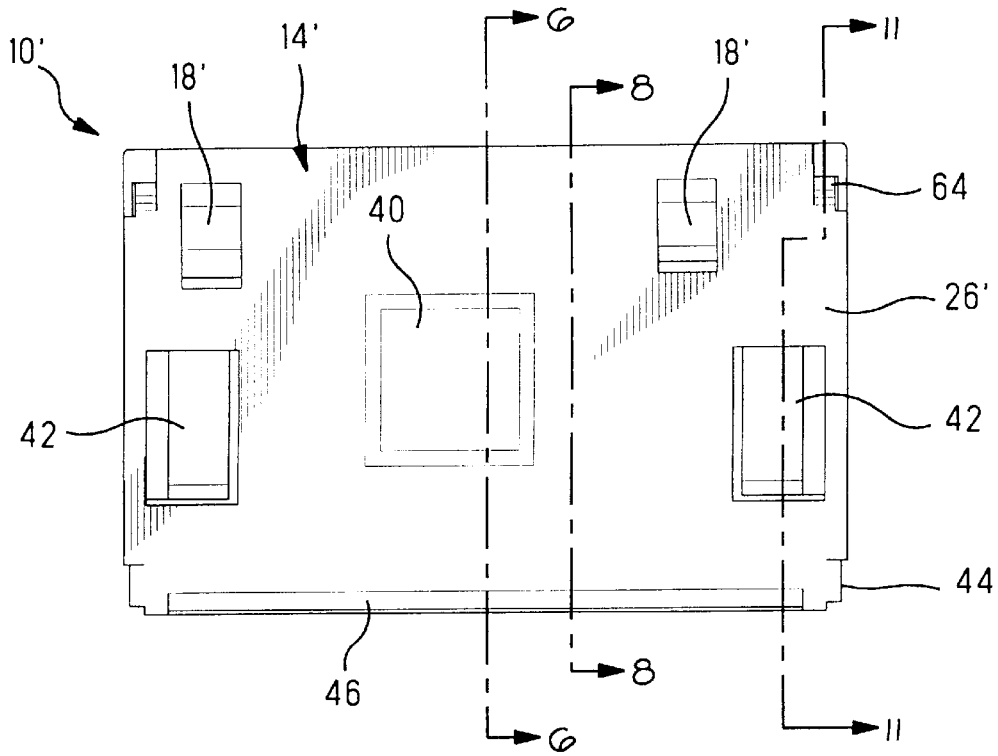
FIG. 2 shows a top view of an alternate embodiment of the smart card reader according to this invention.
Figure 3:
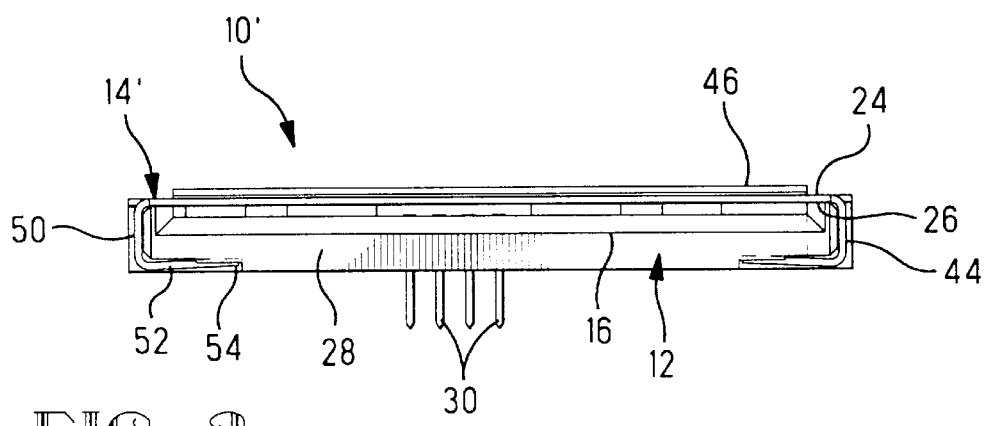
FIG. 3 shows a front view of the smart card reader of FIG. 2.
Figure 8:
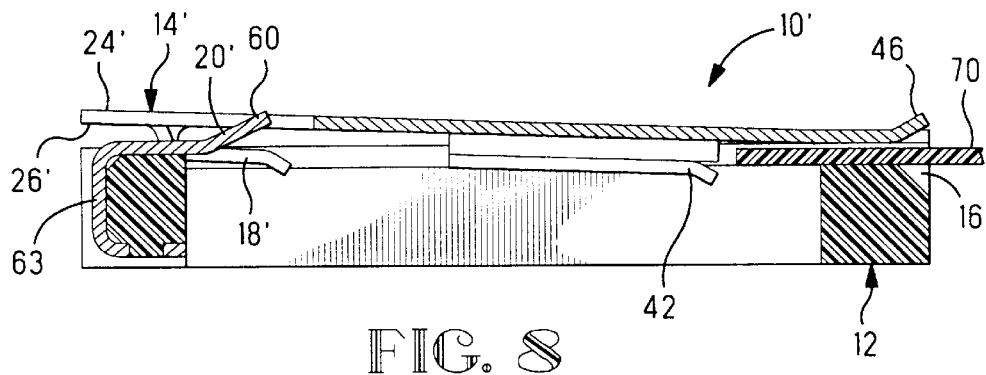
FIGS. 8, 9 and 10 are cross sectional views taken along the line 8—8 of FIG. 2 showing a progression of a mating cycle with a smart card.
Figure 11:
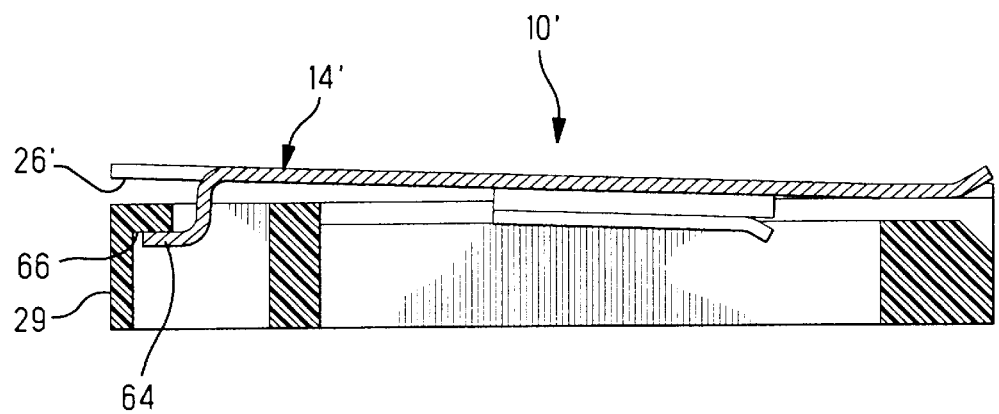
FIGS. 11 and 12 are cross sectional views taken along the line 11—11 of FIG. 2 showing stop projections of the base against which the cover is biased.
Figure 12:
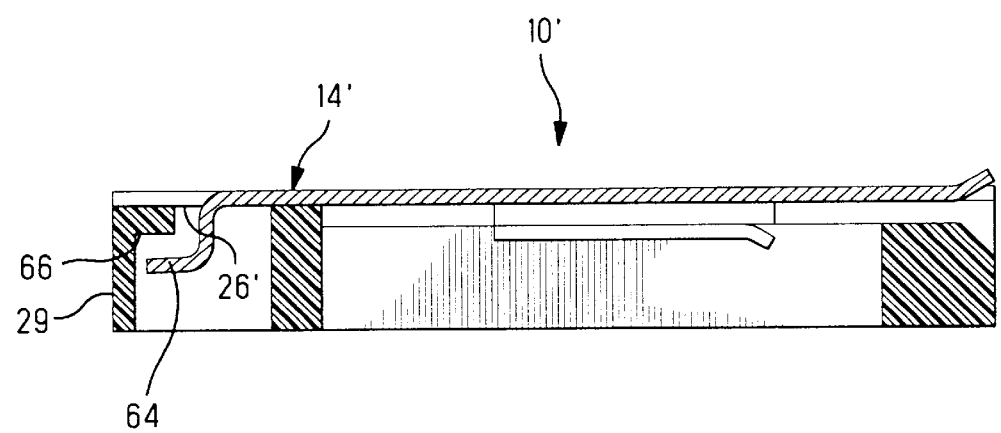

Referring to FIGS. 2–4, the stamped and formed cover 14' is mounted to the base 12 through a pair of mounting arms 44 which wrap around the top, side, and bottom edges of the base 12 proximate the first end 28. Each mounting arm 44 consists of a side leg 50 which is bent perpendicular to the top and bottom surfaces 24,26 and a bottom leg 52 which is bent at an acute angle to the side leg 50 such that it contacts the base 12 only at an extreme edge 54 (FIG. 3). A lead in surface 46 is provided proximate the mating end 28. Cover 14' is also profiled to have guide members 42 which are stamped and formed from the cover 14' such that they are disposed below the bottom surface 26' as best seen in FIGS. 2 and 8. A depression 40 is similarly formed in the center of the cover 14' such that it projects below the bottom surface 26' as best seen in FIGS. 2 and 6. The card supports 18' are similarly stamped and formed from the cover 14' such that they project below the bottom surface 26' as best seen in FIGS. 2 and 8. Overstress projections 66 are also stamped and formed near the second end 29 to extend below the bottom surface 26' as best seen in FIGS. 5 and 11.

The base 12 will now be described in greater detail with reference to FIGS. 5 to 10. A top view of the base 12 is shown in FIG. 5 which shows how the contacts 30 are mounted therein such that four exit the bottom of the base 12 proximate the first end 28 and four exit the base at the second end 29. A pair of actuators 20' are provided at the second end 29 as shown in FIGS. 5 and 8. The actuators 20' are simply stamped and formed having a lead in edge 60 and a securing section 63 which is wrapped around the top, rear, and bottom surfaces of the base 12 as best seen in FIG. 8. This arrangement allows for cards 70 having varying thicknesses due to tolerance variations to be accepted in the card receiving area 32. A thick card will cause the actuator 20' to spring away from the base 12 to increase the space between the actuator 20' and the card support 18. The card-receiving opening 16 is provided at the first end 28 has a lead in surface 17 which extends from the first end 28 to the cardreceiving area 32. Arm-receiving areas 62 disposed along side walls of the base 12 are provided for receiving the mounting arms 44 of the cover 14. Stop surfaces 66 are formed at the second end 29 to engage overstress projections 64 of the cover 14' as shown in FIGS. 5 and 11.

Figure 1:
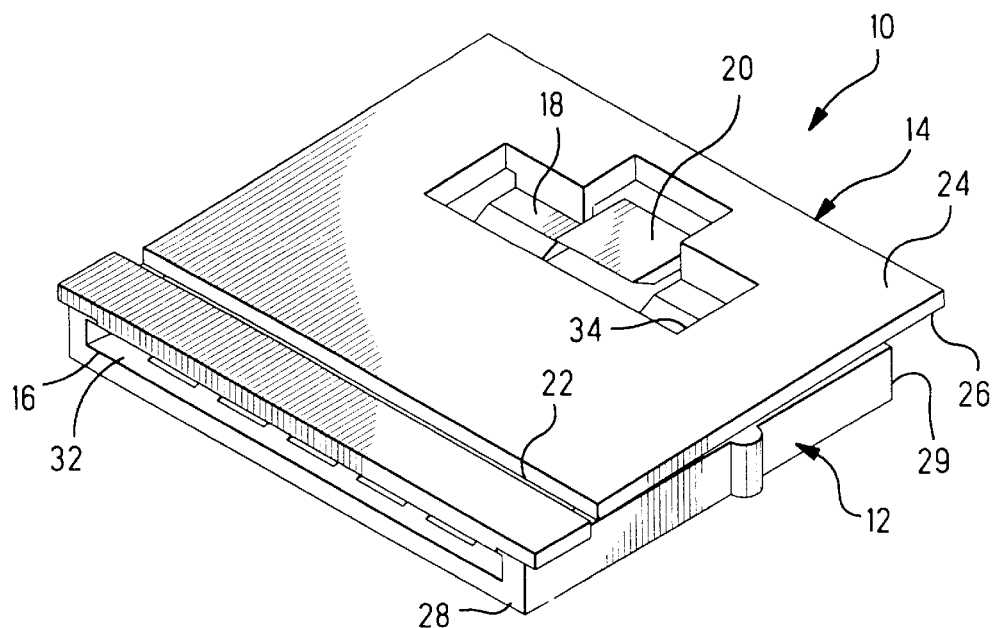
FIG. 1 shows a three-dimensional view of a smart card reader according to this invention.

The cover 14 is mounted to the base 12 as shown in FIG. 1 either by use of an adhesive or mounting screws which pass through the cover 14 and into the base 12. The cover 14' of FIGS. 2–4 is mounted to the base 12 by the mounting arms 44 which are wrapped around the arm-receiving areas 62 and engage the bottom of the base 14 at an extreme end 54 of the bottom leg 52. The mounted cover 14' is biased upwards such that its lower surface 26' is spaced from the base 12 at the second end 29. The overstress projections 64 (FIGS. 2,11) formed in the cover 14' proximate the second end 29 engage the stop surfaces 66 of the base 12 to limit the spacing between the bottom surface 26' and the base 12 when the cover 14' is in an open position as best seen in FIG. 11.

Figure 9:
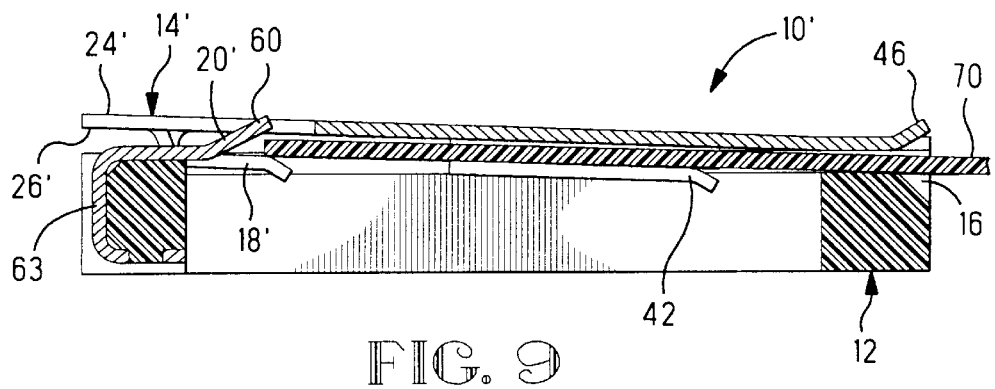
Figure 10:
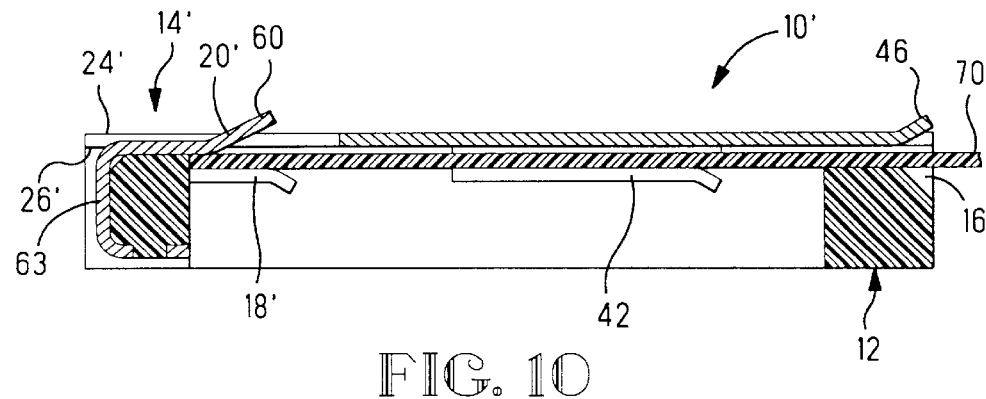

Insertion of a smart card 70 and operation of the reader 10 will now be described in greater detail with reference to FIGS. 6 to 11. The mating cycle begins with the reader 10' having the cover 14' in the open position as shown in FIG. 11. A smart card 70 is then introduced into the card-receiving opening 16 as shown FIG. 8. Further insertion of the smart card 70 will result in engagement with the guide projections 42 as shown in FIG. 9 and then engagement with card supports 18'. Finally, as the smart card is further inserted into the reader 10' (FIG. 10), it engages the actuator 20' to draw the smart card and the cover 14' into the read position as shown in FIG. 10. It should also be noted that in the center of the cover 14' the depression 40 serves to press the smart card 70 against the contacts 30 when the smart card 70 is in the read position as shown in FIG. 7. FIGS. 6 and 7 show a cross section taken in the center of the reader 10' along the line 6—6 of FIG. 2. FIG. 6 shows the smart card 70 in the same position as in FIG. 9, and FIG. 7 shows the smart card 70 in the read position as in FIG. 10. The smart card 70 will slightly flex in the area over the contacts 30 to exert a greater contact force between the pads of the card and the contacts 30. Because the actuator 20' is allowed to flex for accepting cards 70 of varying thickness as described above, any smart card 70 which is inserted will have its pads aligned along the top surface of the base 12. The top of the base therefore establishes a datum on which the contacts will always mate with the pads regardless of card thickness.

Upon removal of the smart card 70, the cover 14' will return to its initial position as shown in FIG. 11 through a progression which is opposite that described above and can be seen in FIGS. 10, 9, 8 and finally 11.

An advantage of this invention is that it provides a simple combination of a landing and sliding type smart card reader arrangement which offers sufficient wiping action to achieve good electrical connection without excessively wiping on the plastic areas of the smart card 70 to create unwanted dust or debris. Another advantage of this invention is that the depression 40 provides additional mating force on the contact pads and the contacts 30. Yet another advantage of this invention is that the card guide projections 42 of the cover 14' serve to keep the card away from wiping with the contacts 30 during the mating cycle. Another advantage of this invention is that the mounting arrangement of the actuator 20' to the base 12 allows the smart card reader 10' to accept smart cards 70 having different thicknesses due to variations in thickness tolerance without requiring the contacts 30 to travel different distances for different card thicknesses. Another advantage of this invention is that the number of major components has been minimized in order to remove unnecessary spring components or actuating mechanisms of the prior art.

We claim:

1. A smart card reader having a base which supports electrical contacts and a card receiving area comprising:

a cover being hingeably mounted to the base at a first end and biased to be spaced apart from the base at a second end, the cover having an inner surface proximate the card receiving area, an outer surface opposite the inner surface, and a card support disposed on the inner surface proximate the second end, whereby a card is insertable into the card receiving area until it first engages the card support and then engages a cover actuating surface of the base to draw the card and the second end of the cover toward the base.

2. The smart card reader as recited in claim 1 wherein the cover is stamped and formed from a sheet of material and further comprises a pair of mounting arms extending along opposite sides thereof for engaging respective side surfaces of the base.

3. The smart card reader as recited in claim 2 wherein each of the mounting arms comprise a side leg which is substantially perpendicular to a top surface of the cover; and a bottom leg which extends from the side leg and is bent at an acute angle to the side leg.

4. The smart card reader as recited in claim 3 wherein a free end of the bottom leg contacts a bottom surface of the base.

5. The smart card reader as recited in claim 4 wherein the bottom leg of the mounting arm is flexible.

6. The smart card reader as recited in claim 1 further comprising at least one card guide projection extending from the outer surface of the cover toward the base into the card receiving area.

7. The smart card reader as recited in claim 1 further comprising a contact force depression formed in the cover and extending from the inner surface toward the base in an area opposite the electrical contacts.

8. The smart card reader as recited in claim 1 wherein the cover further comprises at least one overstress projection extending therefrom toward the base for engaging a stop projection of the base when the cover is in an open position and biased away from the base.

9. The smart card reader as recited in claim 1 wherein the base further comprises at least one stop projection for engaging at least one overstress projection of the cover when the cover is in an open position.

10. The smart card reader as recited in claim 1 wherein the cover actuating surface is flexible so as to accept cards of various thickness between the cover actuating surface and the card support.

\* \* \* \* \*